Nov. 30, 1965  JEAN-PAUL BERNARD ETAL  3,220,673
AUTOMATIC CONTROL ARRANGEMENT FOR AIRCRAFT BARRIERS
Filed Nov. 12, 1963
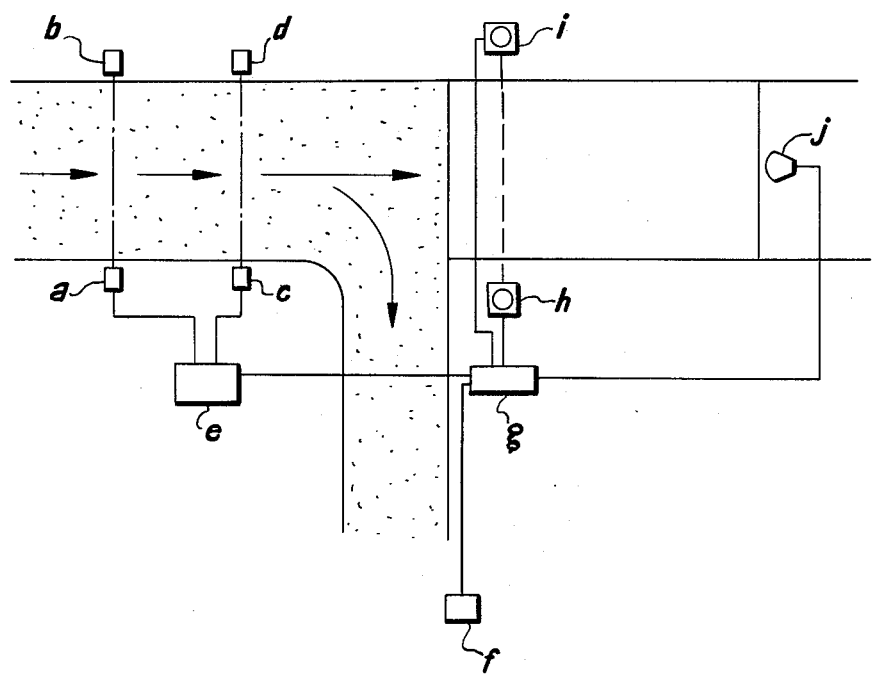
INVENTORS
JEAN-PAUL BERNARD
JACQUES GOUYO-BEAUCHAMP
BY
AGENT

United States Patent Office 3,220,673
Patented Nov. 30, 1965

3,220,673
AUTOMATIC CONTROL ARRANGEMENT FOR AIRCRAFT BARRIERS
Jean-Paul Bernard, Paris, and Jacques Gouyou-Beauchamps, Seine-et-Oise, France, assignors to Aerazur Constructions Aeronautiques S.A., Issy-les-Moulineaux, France, a French company
Filed Nov. 12, 1963, Ser. No. 340,840
Claims priority, application France, Nov. 12, 1962, 915,140, Patent 1,351,450
1 Claim. (Cl. 244—110)

This invention relates to barriers vertically movable between operative and inoperative positions at the end of an airport runway to prevent airplanes from overshooting the runway. More particularly, the invention is concerned with automatic controls for moving a barrier of the type described from the inoperative into the operative position.

It is known to employ automatic controls for raising a barrier at the end of a runway when an airplane approaches that end at a speed higher than would permit the plane to be stopped on the runway by its own devices. The automatic controls are intended to remedy occasional failures in the controls operated by the control tower or by the pilot himself by means of a radio signal.

The known devices cause the barrier to be raised if the plane still rolls on the ground when at a predetermined distance from the barrier. This arrangement is expected to avoid raising a barrier in front of an airplane which rises very gradually in a long take-off but experience has shown that, on certain short runways, the point at which the plane lifts from the ground in a long take off, for example, after engine trouble, is very close to the point at which the presence of the plane must actuate a control for raising the barrier.

This fact makes it very difficult to use automatic barrier controls of the conventional type. It is usual for the control tower under such circumstances to block the automatic controls at the instant of take-off in order to prevent raising of the barrier by a plane rising gently in a long take-off. Raising of the barrier in this event could have catastrophic consequences. The lower the plane, the greater the danger posed by the raised barrier.

The necessity of inactivating the automatic controls prior to take-off is a serious disadvantage of the known devices. If trouble develops at the take-off, the plane reaches the location of the barrier extremely fast and the time available to the operator at the control tower for raising the barrier may be too short.

The object of the invention is the provision of a control system which overcomes the afore-described shortcomings of the conventional devices.

More specifically, the invention aims at providing automatic barrier controls which are capable of distinguishing between a plane whose pilot has decided to be arrested by the barrier, and between a plane whose pilot risks a take off under unfavorable conditions. In the latter case, the pilot is spared the sudden erection of an obstacle in his path during a maneuver which is inherently difficult enough.

This invention is based on the fact that a plane engaged in an attempted take-off requires a certain minimum thrust from its engines, and necessarily accelerates, whereas a plane whose pilot intends to be arrested by the barrier normally has the brakes applied, and decelerates. Even if the time available to the pilot were too short for application of the brakes, one may rely on the pilot's reflexes to cut the engines off, whereby the plane decelerates or at least does not accelerate in approaching the location of the barrier.

The automatic controls of the invention are equipped with a device for sensing the acceleration of a plane approaching the barrier. If the sensed acceleration of the plane is below a predetermined threshold value, the barrier is raised. A representative figure for such a threshold value may be one meter per second per second or 0.1 $g$ ($g$=acceleration of gravity) where the normal acceleration on take-off is approximately 0.2 $g$, and the minimum acceleration on take-off is 0.15 $g$. These figures are merely illustrative and a suitable value of the acceleration threshold will readily be determined under specific conditions.

Numerous devices for measuring acceleration are known, and others will readily suggest themselves from the following description of illustrative control systems of the invention.

Example 1

A light projector and a photoelectric cell are arranged opposite each other across the runway in each of three positions equally spaced in the direction of take-off near the end of the runway. A plane approaching the end of the runway sequentially intersects the three beams of light at respective times $t_1$, $t_2$, and $t_3$.

The time required for the airplane to move from the first beam to the second beam is compared with the time of movement from the second to the third beam by conventional electronic equipment connected to the three photoelectric cells. Such equipment, for instance, may charge a first condenser during the period $t_1$ to $t_2$, and a second identical condenser during the time $t_2$ to $t_3$. The condensers then are discharged against each other, and the direction of current flow furnishes a signal indicative of the acceleration or deceleration of the airplane.

A deceleration signal is employed in a conventional manner to start electric motors which raise the barrier.

The following precautions should be taken:

The ground speed of the plane should be determined in any conventional manner and the barrier raising mechanism should be blocked unless the speed of the plane is higher than that normal for a plane which is to be taxied off the end of the runway in routine operations. The speed limit below which the barrier raising controls should be inoperative may be selected to suit specific conditions. Forty meters per second is a value applicable in many instances.

The control system is preferably made ready by the front running gear intersecting a light beam but time is measured from the passage of the rearmost wheel through the beam. This is important in the case of a plane taking off between the second beam and the third beam, and prevents time from being measured between interception of the first and second beams by the front wheels and of the third beam by the rear wheels. An erroneous deceleration signal would be generated and the barrier would be raised before a plane which is barely airborne.

Example 2

The three light beams of the first example may be replaced by weight sensitive bars lying across the runway. Such bars are conventionally employed for traffic counts on highways, or for signaling the presence of a customer at a gasoline station, and need not to be described in detail.

The signals received in sequence from the bars are fed to an electronic time comparator circuit which may be of the well known type described in Example 1. A deceleration signal derived from the bars or from the photoelectric cells of the preceding example is employed to trigger energizing of electric motors which raise the barrier.

The signal of the weight sensitive bars responsive to passage of the front wheel or wheels may be employed for the time count. It is not necessary in this case to measure time from the passage of the rear wheel. The same precautions should be taken against raising of a barrier ahead of a slow moving airplane and the ground, and is preferred for this reason.

When a radar device alone is employed for measuring the acceleration of the approaching airplane and for actuating the drive which raises the barrier, it is advisable separately to measure the ground speed of the airplane and to prevent raising of the barrier regardless of deceleration if the ground speed is below a predetermined threshold level.

*Example 3*

An even safer control arrangement for a barrier may be based on a radar system in which the output current of the radar apparatus is employed for blocking all barrier raising controls, automatic or manual, if the approaching plane accelerates. Such a system may be devised as follows:

The radar system has an output current of zero if the acceleration of the approaching plane is equal, to or greater than, a predetermined value, say 0.05 g. When the acceleration is smaller than 0.05 g., the output current has a positive value. If the radar system fails, its output current is zero. As long as the output current is zero, either because of malfunctioning of the radar system or because the plane accelerates at an approximately normal rate, all control circuits to the barrier-raising drive are blocked. When the output current is positive, that is, when the plane moves at practically constant speed or decelerates, the barrier drive is unblocked.

The radar system may operate either permanently or intermittently. In the latter case, it may be actuated in a conventional manner by the plane passing a location relatively remote from the runway end, a light beam or a weight-sensitive bar being employed in a manner evident from Examples 1 and 2.

The use of a radar system which blocks raising a barrier unless deceleration of an approaching airplane is sensed offers a maximum of safety, and prevents untimely raising of the barrier in the event of equipment breakdown or of an error of the control tower operator.

In order to guard against breakdown of the equipment, the tower should be equipped with means for raising the barrier regardless of the output of the radar system. Such overriding control means permits the functioning of the barrier to be checked and emergency action to be taken by the operator. The overriding controls are preferably actuated by a spring-biased push button which returns to its inoperative position as soon as the pressure of an applied finger is relaxed.

The sensing and control systems described in Examples 1 and 2 may be used or modified in an obvious manner to block the conventional automatic or manual controls of a barrier raising drive. They are less convenient, however, because they provide only an instantaneous deceleration signal, whereas a radar system generates a continuous signal. There is obtained a double control rather than a safety device.

The sole figure of the appended drawing further illustrates the arrangement of a barrier control system of the invention. The drawing shows diagrammatically a portion of an airport on a greatly reduced scale.

The paved area of the airport is indicated by hatching. There is seen a relatively wide runway and a narrower taxiway extending at right angle from the end of the runway. A straight arrow indicates the normal direction of airplane movement during take-off, and the curved arrow the path followed by an airplane entering the taxiway.

Two beams of light indicated by broken lines are projected across the runway from projectors $b$ and $d$ toward light-sensitive receptors, such as photoelectric cells $a$ and $c$. The two light beams are spaced from each other and from the runway end in the direction of take-off run.

Immediately adjacent the end of the paved runway, a barrier net is stretched across an unpaved runway extension between two columns $h$ and $i$ equipped to raise the barrier net from the ground in a conventional manner, the necessary drives being actuated by electric motors, not shown in detail.

When the light beams of the projectors $b$ and $d$ are intercepted by a passing plane, the resulting output signals of the photoelectric cells $a$ and $c$ are fed to a time measuring device $e$ which emits a speed signal if the period between the individual signals of the photoelectric cells $a$ and $c$ is shorter than a predetermined period. That predetermined period is selected to correspond to the maximum ground speed of a plane passing the light beams which would still safely maneuver the turn into the taxiway at the end of the runway. The signal from the time measuring device $e$ is transmitted to the barrier raising control proper $g$ which energizes the motors in the columns $h$ and $i$.

A similar signal may also be transmitted to the barrier raising control $g$ from the control tower $f$.

A radar system $j$ located beyond the runway end faces the approaching plane. It is connected to the barrier raising control $g$ and emits an unblocking current to the control $g$ if the acceleration of an approaching airplane is sensed to be lower than a preset value, as described in Example 4. Unblocking by the acceleration signal makes the control $g$ ready to energize the barrier lifting motors if a speed signal is received either from the time measuring device $e$ or from the control tower $f$.

It is evident that the light beams intersected by a passing airplane may be replaced by the afore-mentioned weight sensitive bars, or by a radar beam to produce a signal responsive to the ground speed of the plane, whereby the barrier raising signal of the speed detecting radar device may be blocked or unblocked by the signal of the acceleration detecting radar device.

Obviously, other modifications and variations of the present invention are possible in the light of the above teachings. It is therefore to be understood that within the scope of the appended claim, the invention may be practiced otherwise than as set forth in the appended claim.

What is claimed is:

An apparatus for raising an airplane arresting barrier at the end of an airport runway comprising:
  (a) first sensing means for sensing the ground speed of an airplane approaching said runway end and for generating a speed signal responsive to a sensed ground speed of said airplane greater than a predetermined ground speed;
  (b) second sensing means for sensing the acceleration of said airplane and for generating an acceleration signal responsive to an acceleration of said airplane smaller than a sensed acceleration; and
  (c) barrier raising means connected to said first and second sensing means and selectively responsive to jointly received speed and acceleration signals for raising said barrier.

References Cited by the Examiner

UNITED STATES PATENTS

| | | | |
|---|---|---|---|
| 2,448,039 | 8/1948 | Lynn | 244—110 |
| 2,955,209 | 10/1960 | Eckweiler et al. | 244—110 X |
| 3,128,066 | 4/1964 | Bailey | 244—110 X |

FERGUS S. MIDDLETON, *Primary Examiner.*

MILTON BUCHLER, *Examiner.*